W. J. ROBINSON.
TIRE.
APPLICATION FILED JAN. 29, 1917.
1,250,510.
Patented Dec. 18, 1917.
3 SHEETS—SHEET 1.
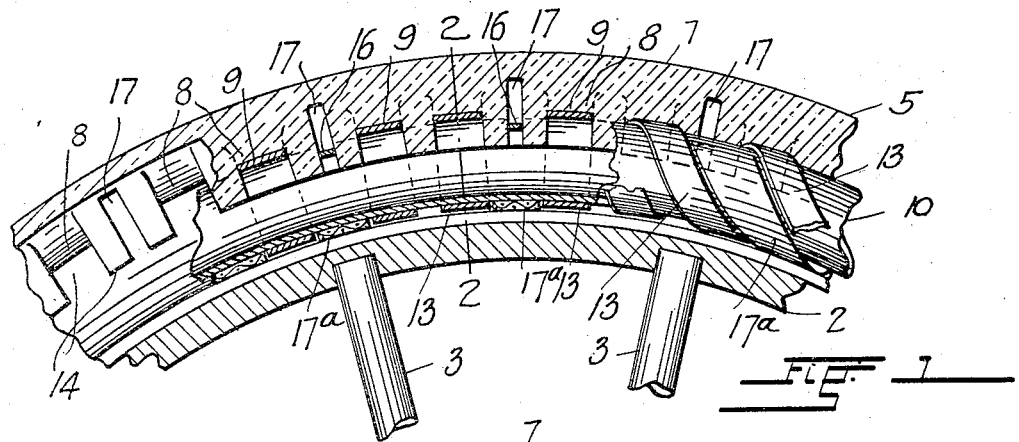
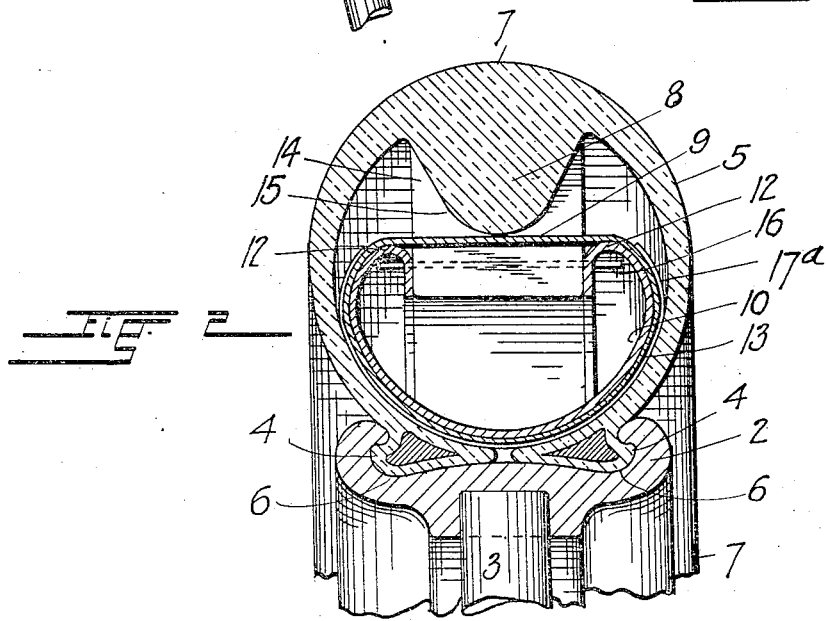
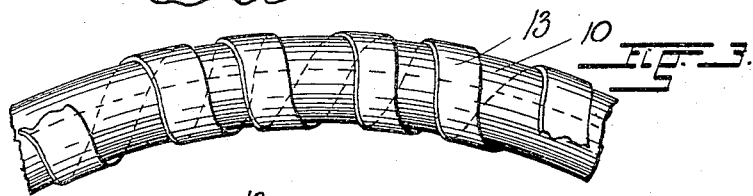
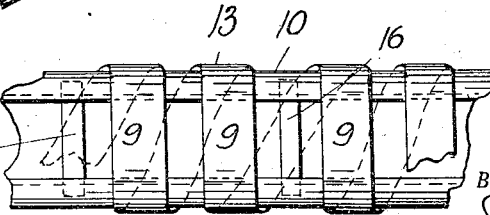
WITNESSES:
INVENTOR.
W. J. ROBINSON,
BY
ATTORNEY.

W. J. ROBINSON.
TIRE.
APPLICATION FILED JAN. 29, 1917.
1,250,510.
Patented Dec. 18, 1917.
3 SHEETS—SHEET 2.
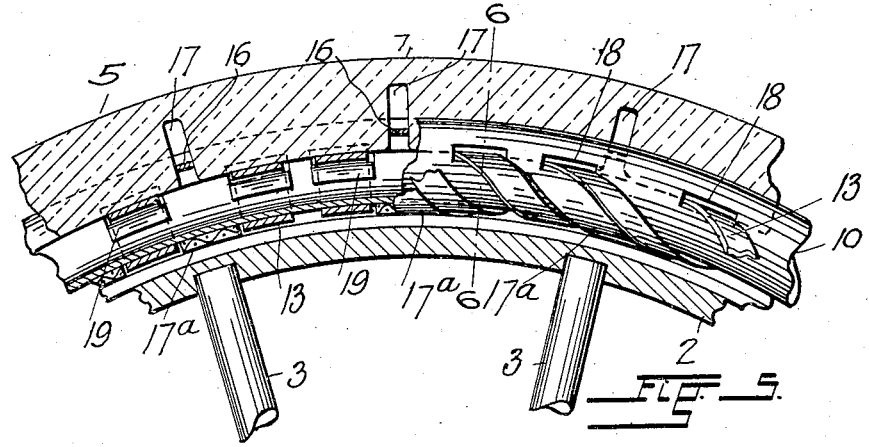
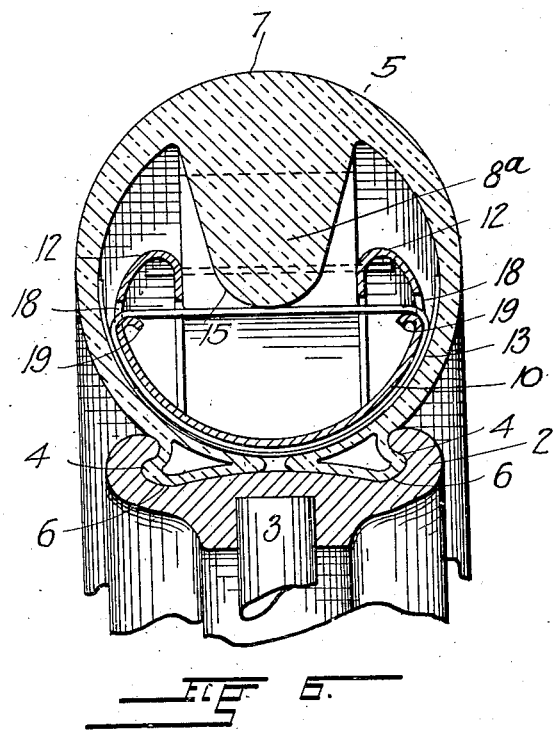
WITNESSES:
INVENTOR.
W. J. ROBINSON.
BY
ATTORNEY.

W. J. ROBINSON.
TIRE.
APPLICATION FILED JAN. 29, 1917.
1,250,510.
Patented Dec. 18, 1917.
3 SHEETS—SHEET 3.
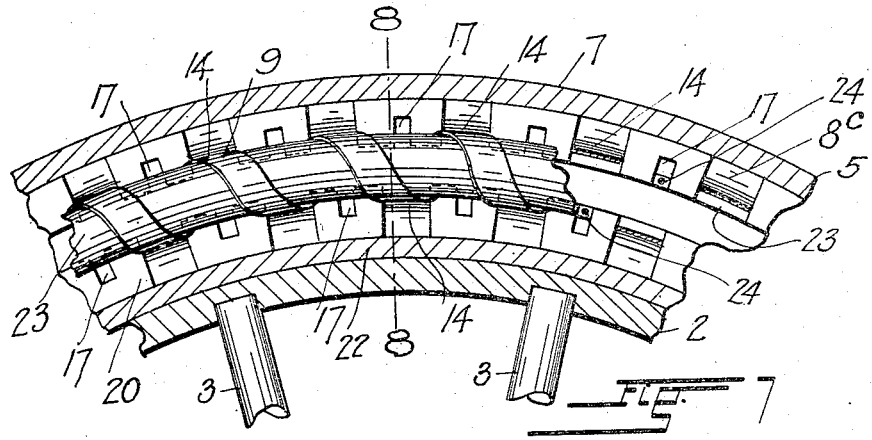
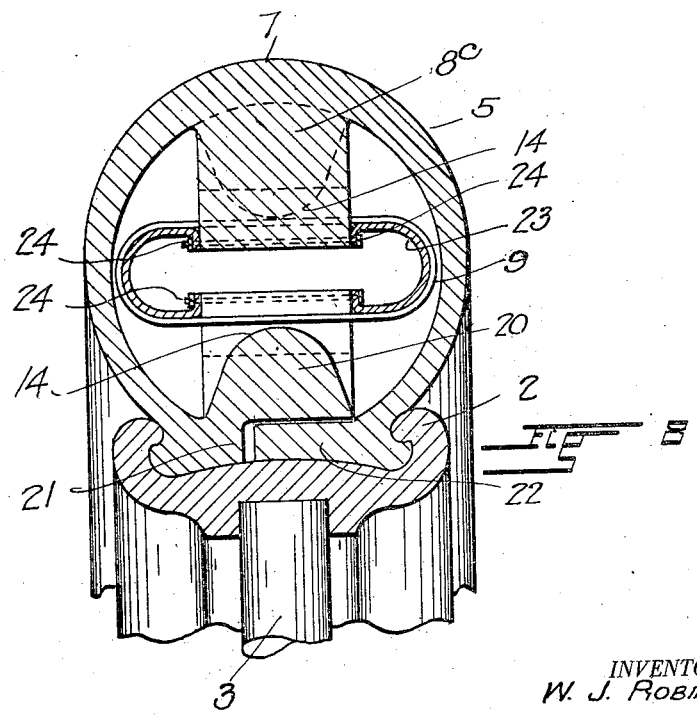
WITNESSES:
F. H. Cuno.
L. Rhodes
INVENTOR.
W. J. ROBINSON.
BY
ATTORNEY.

UNITED STATES PATENT OFFICE.

WILLIAM J. ROBINSON, OF DENVER, COLORADO.

TIRE.

1,250,510.  Specification of Letters Patent.  Patented Dec. 18, 1917.

Application filed January 29, 1917. Serial No. 145,203.

*To all whom it may concern:*

Be it known that I, WILLIAM J. ROBINSON, a citizen of the United States, residing at Denver, in the county of Denver and State of Colorado, have invented certain new and useful Improvements in Tires, of which the following is a specification.

My invention relates to wheel tires of the type commonly used on automobiles and its object is to provide a tire which possesses all the shock-absorbing qualities of a pneumatic tire, without any of the well-known disadvantages of the same.

The principal element of the present invention consists of a series of resilient bands which are stretched upon a rigid support within and transversely of a tube which is secured to the felly of the wheel and which is made in accordance with the shoe or outer covering of the pneumatic tire at present in common use.

The tube has interiorly opposite its circumferential tread an annular ridge which bears upon the transverse springs and causes them to stretch when the tire of which the tube is a part, is subjected to pressure by contact with obstructions on the road along which it moves.

An embodiment of my invention is shown in the accompanying drawings in the various views of which like parts are similarly designated, and in which—

Figure 1 is a longitudinal section through my improved tire,

Fig. 2, an enlarged transverse section of the tire taken along the line 2—2, Fig. 1, Fig. 3, an elevation of a part of the rigid support disposed within the outer covering or shoe of the tire, showing the method of arranging the transverse springs thereon, Fig. 4, a plan view of the parts shown in Fig. 3, Fig. 5, a longitudinal section of the tire showing a modification of the construction illustrated in Fig. 1, Fig. 6, a transverse section along the line 6—6, Fig. 5, drawn to an enlarged scale, Fig. 7, a longitudinal section of the tire showing another modification of the construction shown in Figs. 1 to 4, and Fig. 8, an enlarged transverse section taken along the line 8—8, Fig. 7.

In the drawings the reference numeral 2 designates the felly or rim base of a vehicle-wheel to which are secured the spokes 3 and which is formed with annular recesses 4 to secure a tire-shoe 5 of the so-called clencher type.

The shoe or outer covering of the tire is made substantially like those of the pneumatic tires at present in use and it has at its separated longitudinal edges, outwardly projecting reinforced flanges 6 which fit into the turned-over edges of the wheel rim.

The shoe has interiorly opposite to its tread 7, an annular ridge 8 which bears upon a series of transverse springs 9 on a rigid support 10 which occupies the inner portion of the shoe and bears against the parts of the shoe which engage the felly of the wheel to which the tire is applied.

The spring-support 10 which is made of aluminum or other suitable material, is in the construction shown in Figs. 1 to 4, composed of a trough-shaped ring the longitudinal edges of which are bent inwardly to provide two opposite rounded ridges 12 over which the springs may bend without breaking.

The series of springs are provided by a preferably continuous tape 13 of flexible material which is wound spirally around the ring 10 and securely fastened at its ends.

The parts of the tape extending transversely across the circumferential opening of the ring and between its rounded ridges, constitute the elastic bands or springs which serve as a resilient backing for the shoe-tread.

To prevent relative displacement of the parts when the tire is in use, the ridge 8 of the shoe which fits snugly between the inturned edges of the rigid support, is transversely grooved to provide recesses 14 for the reception of the transverse springs 9, and its parts at the bottom of the recesses which engage the springs, are rounded and tapered as at 15, to permit of the springs flexing into the hollow support when the corresponding parts of the tire-shoe are subjected to pressure.

The support 10 is reinforced by transverse braces 16 which span the space between its inturned longitudinal edges, and the ridge 8 of the tire-shoe is provided with a corresponding number of grooves 17 in which the braces are loosely fitted.

It will thus be seen that I have provided by means of three coöperative parts of very simple construction, a highly efficient resilient tire which by flexure of the series of elastic bands upon which its shoe is supported, will effectively absorb the road shocks to which a wheel upon which a tire is applied, is subject.

To lessen wear of the tape 13 wound around the rigid support, by contact with the surface of the shoe, strips of felt 17$^a$ are fastened exteriorly of the support between the windings of the tape. The felt being thicker than the tape, engages the inner portion of the shoe in which the support is inclosed and thereby separates both the support and the tape wound thereon, from contact with the shoe.

The parts of which the tire is composed may be modified in construction within the spirit of my invention as is evidenced by the construction shown in Figs. 5 and 6 in which the tape of which the transverse springs are formed, is inserted through slots 18 in the sides of the support instead of being drawn across the longitudinal edges of the same.

An advantage of this construction is that the recesses in the tire-shoe of the first-described form may be omitted.

The ridge 8$^a$ is in this case rounded at its periphery at the points at which it engages the springs and the recesses for the braces on the rigid support are made shallower than those of the first-described construction.

The tire shoe is thus materially strengthened and by bending the portions of the metal of the support at the points at which its slots are formed, inwardly as shown at 19 in Fig. 6, rounded seats are provided for the transverse bands upon which to bear when flexing inwardly by pressure on the parts of the shoe with which they engage.

Another modification of the construction hereinbefore described, is illustrated in Figs. 7 and 8 in which the shoe 5 has opposite its annular ridge 8$^c$ a supplemental ridge 20 of similar construction.

The second ridge 20 is formed integral with the portion of the shoe by means of which it is attached to the felly 2 and which in the modified construction is composed of two lapping parts 21 and 22.

The spring support is in this form composed of two annular parts 23 the longitudinal edges of which are bent inwardly and connected by means of a number of bolts 24.

The support is disposed between the two ridges of the shoe which fit between the inturned edges of its two parts to enter the space between the latter when the tire is subjected to pressure by obstructions encountered on the road along which a wheel upon which the tire is mounted, is impelled.

The two ridges of the tire-shoe bear against springs stretched across the space between the parts of the support. These springs are like those of the first-described form of the invention, that is, a tape of resilient material wound spirally around the support and fastened at its ends.

Both ridges of the shoe are recessed like the single ridge of the form illustrated in Fig. 1, to receive the transverse springs and the bolts 24 which connect the parts of the support and the bottoms of the recesses are likewise tapered and rounded to engage the springs.

A tire constructed in accordance with the last-described form of my invention, has a greater degree of resiliency and is particularly adapted for use on light vehicles which require a more elastic support to absorb the road shocks to which they are subject.

I desire it understood that while I preferably provide the series of springs by winding a continuous tape of resilient material around the rigid support, the tape of which the springs are formed may be made in sections or the springs may be made separately of strips of tape fastened transversely of the opening in the periphery of the support.

The support may also be varied in form and construction according to different requirements, and other modifications in the form and arrangement of the parts of my improved tire may be resorted to without departing from the spirit of my invention as defined in the following claims.

I claim:—

1. A tire comprising a flexible shoe having inward of its tread, an annular inwardly projecting ridge which is tapered at intervals, an annular support within the shoe, which is open at its outer periphery to provide an entrance for said ridge, and springs stretched across said support, in engagement with the tapering portions of said ridge.

2. A tire comprising a flexible shoe having inward of its tread, an annular inwardly projecting transversely grooved ridge tapered at the bottom of its grooves, an annular support within the shoe, which is open at its outer periphery to provide an entrance for said ridge, and springs stretched across said support, within the grooves of said ridge.

3. A tire comprising a flexible shoe having inward of its tread, an annular, inwardly projecting ridge transversely grooved at intervals, an annular support within the shoe, which is open at its outer periphery to provide an entrance for said ridge, springs stretched across the opening of the ring, in engagement with the ridge, and transverse braces on the ring, within the grooves of the ridge.

4. A tire comprising a flexible shoe, an annular support within the shoe, which is open at its periphery, springs stretched across the opening of said support, and an annular ridge on said shoe extending through said opening and having tapering seats in engagement with said springs.

5. A tire comprising a flexible shoe, an annular support within the shoe, and springs stretched across said support at its inner and outer pheripheries, in engagement with opposite parts of the shoe.

6. A tire comprising a flexible shoe, an annular support within the shoe which is open at its inner and outer peripheries, springs stretched across the openings of said support, and ridges on the shoe, adapted to enter through said openings, and engaging said springs.

7. A tire comprising a flexible shoe, an annular support within the shoe, which is open at its inner and outer peripheries, springs stretched across the openings of said support, and ridges on the shoe extending through said openings and having tapering seats in engagement with said springs.

8. A tire comprising a flexible shoe having interiorly, two opposite ridges, and two sets of springs extending transversely of the shoe, in engagement with said ridges.

9. A tire comprising a flexible shoe having interiorly, two opposite ridges, an annular support within the shoe, and springs stretched across the inner and outer peripheries of said support, in engagement with said ridges.

In testimony whereof I have affixed my signature in presence of two witnesses.

WILLIAM J. ROBINSON.

Witnesses:
G. J. ROLLANDET,
L. RHOADES.

Copies of this patent may be obtained for five cents each, by addressing the "Commissioner of Patents, Washington, D. C."